US010683783B2

(12) United States Patent
Blasinski

(10) Patent No.: US 10,683,783 B2
(45) Date of Patent: Jun. 16, 2020

(54) METHOD FOR OPERATING A MOTOR VEHICLE PROVIDED WITH A HYBRID DRIVE APPARATUS AND A CORRESPONDING MOTOR VEHICLE

(71) Applicant: AUDI AG, Ingolstadt (DE)

(72) Inventor: Boris Blasinski, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 17 days.

(21) Appl. No.: 15/647,807

(22) Filed: Jul. 12, 2017

(65) Prior Publication Data

US 2018/0030866 A1 Feb. 1, 2018

(30) Foreign Application Priority Data

Jul. 27, 2016 (DE) .......................... 10 2016 213 768

(51) Int. Cl.
*F01M 5/04* (2006.01)
*B60W 20/12* (2016.01)
(Continued)

(52) U.S. Cl.
CPC .............. *F01M 5/04* (2013.01); *B60W 10/06* (2013.01); *B60W 10/08* (2013.01); *B60W 20/12* (2016.01); *B60W 20/15* (2016.01); *B60W 30/192* (2013.01); *B60W 50/0097* (2013.01); *F02D 19/061* (2013.01); *B60W 2552/20* (2020.02);
(Continued)

(58) Field of Classification Search
CPC combination set(s) only.
See application file for complete search history.

(56) References Cited

U.S. PATENT DOCUMENTS

2007/0131193 A1* 6/2007 Takahashi ................ F01M 1/18
123/196 AB
2011/0225949 A1 9/2011 Tewari et al.
(Continued)

FOREIGN PATENT DOCUMENTS

CN 1127328 A 7/1996
CN 102191982 A 9/2011
(Continued)

OTHER PUBLICATIONS

European Search Report dated Feb. 22, 2018, in connection with corresponding EP Application No. 17177332.8 (5 pgs.).
(Continued)

*Primary Examiner* — Lindsay M Low
*Assistant Examiner* — Ruben Picon-Feliciano
(74) *Attorney, Agent, or Firm* — Maier & Maier, PLLC

(57) ABSTRACT

A method for operating a motor vehicle provided with a hybrid drive apparatus. The hybrid drive device is equipped with an internal combustion engine that can be operated with a fuel, as well as with an electric engine, and a lubricant is supplied at least intermittently to the internal combustion engine. At the same time, a lubricant dilution value is determined with a dilution of the lubricant so that the internal combustion engine is started when a first threshold value is exceeded by the lubricant dilution value, and when the motor vehicle is located on a regeneration route of an anticipated driving route of the motor vehicle and the regeneration route is sufficient to reduce the lubricant dilution value by a specified value.

4 Claims, 1 Drawing Sheet

(51) Int. Cl.
*B60W 30/192* (2012.01)
*B60W 20/15* (2016.01)
*B60W 10/08* (2006.01)
*B60W 50/00* (2006.01)
*B60W 10/06* (2006.01)
*F02D 19/06* (2006.01)
*F01M 1/16* (2006.01)

(52) U.S. Cl.
CPC ... *B60W 2556/50* (2020.02); *F01M 2001/165* (2013.01); *F02D 2250/11* (2013.01); *Y02T 10/6291* (2013.01)

(56) References Cited

U.S. PATENT DOCUMENTS

| | | | |
|---|---|---|---|
| 2014/0058647 A1* | 2/2014 | Haladyna | B60K 6/48 701/104 |
| 2014/0174408 A1 | 6/2014 | Pfeiffer | |
| 2016/0102623 A1* | 4/2016 | Hakeem | F02D 41/064 701/113 |
| 2016/0138487 A1* | 5/2016 | Sitzler | F02D 13/0261 701/102 |
| 2017/0009684 A1* | 1/2017 | Kawamura | B60W 20/00 |
| 2018/0003092 A1* | 1/2018 | Macfarlane | F01M 1/16 |
| 2018/0017003 A1* | 1/2018 | Yamaguchi | F01N 3/2066 |

FOREIGN PATENT DOCUMENTS

| | | |
|---|---|---|
| CN | 103628996 A | 3/2014 |
| CN | 103883375 A | 6/2014 |
| CN | 105604713 A | 5/2016 |
| DE | 10 2011 014 164 A1 | 12/2011 |
| DE | 102013216215 A1 | 5/2014 |
| DE | 10 2012 112 794 A1 | 6/2014 |
| DE | 10 2014 016 420 A1 | 5/2016 |
| DE | 10 2014 116 569 A1 | 5/2016 |
| EP | 1586752 A1 | 10/2005 |
| JP | H11210521 A | 8/1999 |
| JP | 2008-267227 A | 11/2008 |
| JP | 2016-113911 A | 6/2016 |

OTHER PUBLICATIONS

German Examination Report dated Oct. 20, 2017 of corresponding German application No. 10 2016 213 768.9; 4 pgs.
German Office Action dated Jul. 6, 2017, in connection with corresponding DE Application No. 10 2016 213 768.9 (8 pgs.).
Office Action dated Jul. 31, 2019, in corresponding Chinese Application No. 201710615527.9; 10 pages.

* cited by examiner

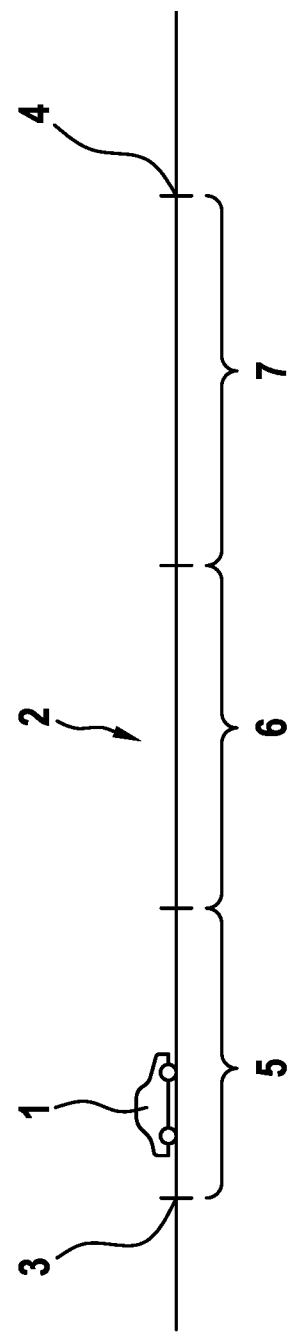

METHOD FOR OPERATING A MOTOR VEHICLE PROVIDED WITH A HYBRID DRIVE APPARATUS AND A CORRESPONDING MOTOR VEHICLE

FIELD

The invention relates to a method for operating a motor vehicle provided with a hybrid drive apparatus, wherein the hybrid drive apparatus is provided with an internal combustion engine which can be operated with a fuel as well as with an electric engine, and wherein a lubricant is supplied at least intermittently to the internal combustion engine. The invention further relates to a motor vehicle.

BACKGROUND

The hybrid drive device is associated with the motor vehicle or forms a component part of the motor vehicle. A torque can be provided by means of a hybrid drive apparatus, which is directed to driving the motor vehicle. The hybrid drive apparatus is equipped with several drive assemblies, which are preferably configured differently. For example, the internal combustion engine is provided as a first drive assembly and the electric engine is provided as a second drive assembly. The multiple drive assemblies are preferably configured or can be operationally connected in such a way that they can jointly generate the torque directed at driving the motor vehicle at least intermittently. In this respect, it is for example possible that the torque is generated only by means of the electric engine, or only by means of the internal combustion engine, or with the electric engine as well as with the internal combustion machine.

Several operating means are supplied at least intermittently to the internal combustion machine in order to operate it, in particular the fuel and the lubricant. The fuel ultimately serves to provide the torque moment with the internal combustion engine, while the lubricant is used for lubrication of the internal combustion engine. The fuel is combusted in the internal combustion engine and consumed in this manner. The lubricant, on the other hand, is provided in a lubricant circuit, wherein the internal combustion engine supplies the lubricant for example from a lubricant reserve so that it is applied to the lubrication of the internal combustion engine and after that, the lubricant or at least the remaining lubricant is temporarily stored again in the lubricant reserve. The lubricant reserve is for example provided in a lubricant tank of the hybrid drive apparatus of the motor vehicle.

Under certain circumstances or in certain operating states of the hybrid drive apparatus or of the internal combustion engine, introduction of fuel into the lubricant can occur, in particular during a warm-up operation of the internal combustion engine. The warm-up operation is present as long as the temperature of the internal combustion engine is lower than its operating temperature, wherein the latter is achieved within the context of a quasi-stationary operation of the internal combustion engine. The warm-up operation of the internal combustion engine is carried out during an operation of the internal combustion engine at a temperature that is lower than the operating temperature. When the temperature of the operating temperature is reached, the warm-up operation of the internal combustion engine is switched to a normal operation of the internal combustion engine. The warm-up operation differs from the normal operation for example in that a different operating strategy is used, in particular because the internal combustion engine is operated in the warm-up operation with a lower efficiency than during the normal operation in order to generate heat which serves to warm up the internal combustion engine.

When fuel is introduced into the lubricant, the latter is diluted so that the now diluted lubricant can no longer provide its lubricating function to the extent intended.

The introduction of the fuel into the lubricant occurs to a larger extent within the context of the hybrid drive apparatus in comparison to conventional drive apparatuses because the motor vehicle can be partially operated solely by the means of the electric engine, which means that the internal combustion engine is at a standstill and therefore must be started more frequently during the travel of the motor vehicle. This means, in view of the preceding explanations, that the warm-up operation of the internal combustion engine during which fuel can be introduced into the lubricant is conducted more frequently, so that the dilution of the lubricant is intensified.

From document DE 10 2013 216 215 A1 is known for example a method for a motor in a hybrid motor vehicle, wherein a motor is operated in reaction to the fact that the oil dilution is higher than a threshold value in order to increase the motor temperature for a period of time above a threshold temperature. The duration of the time period is based on the difference between the oil dilution and the threshold value so that the duration of the time period is increased when this difference is increased.

SUMMARY OF THE DISCLOSURE

The object of the invention is to propose a method for operating a motor vehicle provided with a hybrid drive apparatus which has advantages over known methods, in particular as it avoids methods for reducing dilution of the lubricant that are based solely on the threshold values.

At the same time, the lubricant dilution value of the dilution of the lubricant is determined from the fuel, so that when a first threshold value is exceeded by the lubricant dilution value, the internal combustion engine is started when the motor vehicle is on a regeneration route of an anticipated travel path of the motor vehicle and the regeneration route is sufficient to reduce dilution value of the lubricant by a certain value.

First, the extent of the dilution of the lubricant is determined by means of the fuel in the form of a lubricant dilution value. This can be carried out essentially by using any method. For example, the lubricant dilution value can be measured, derived indirectly from other measured values and/or estimated. If it is at this point determined that the lubricant dilution value exceeds the threshold value, the internal combustion engine is not necessarily started as was partially the case according to the known method. Instead, the internal combustion engine is only started when the first threshold value is exceeded by the lubricant dilution value if the motor vehicle is on a regeneration route or on the regeneration route. The first threshold value corresponds for example to a lubricant value which is present when there is no dilution of the lubricant due to the fuel. As an alternative, however, it can also be larger than this value.

In order to determine whether the motor vehicle is on the regeneration route, the anticipated driving route of the motor vehicle is evaluated. This anticipated driving route is next determined, for example by means of a navigation apparatus of the motor vehicle. The anticipated destination is determined with the aid of the navigation apparatus and based on this anticipated destination, the anticipated driving route to this anticipated destination is determined. The anticipated destination is based for example on user input of a value that is input by the driver of the motor vehicle and/or on an evaluation of the travel data of the motor vehicle. For example, in the latter case, a travel to a certain driving destination in the past can be used for determining and deducing whether the current travel of the motor vehicle is anticipated to lead also to this destination.

After the determination of the anticipated driving route, it is ascertained whether this driving route contains one or several regeneration routes. The regeneration route is in particular characterized in that the operation of the internal combustion engine is possible and/or permissible with the operation parameters, which permits a successful reduction of the lubricant dilution value and thus also dilution of the lubrication means by the fuel. As an operating parameter can be used for example the temperature of the internal combustion engine. In this respect, it is also ascertained whether the internal combustion engine can be operated on at least one regeneration route section so that the temperature at least temporarily reaches the operating temperature and/or a regeneration temperature, wherein the regeneration temperature is higher than the operating temperature.

The regeneration temperature is selected for instance in such a way that a particularly rapid reduction of the lubricant dilution value is possible. To this end, the regeneration temperature corresponds for example to the maximum permissible temperature of the internal combustion engine because the fuel is generally discharged from the lubricant faster the higher the temperature of the internal combustion engine during its operation. It is in any case preferred when the regeneration temperature is higher than the level of the operating temperature at which the operation is switched over from the warm-up operation to the normal operation.

It has now been determined that when the vehicle is currently located at the regeneration route, it can be ascertained whether this is sufficient to reduce the lubricant diluting value by a certain value. The decisive factor is in this case in particular the remaining length of the regeneration route, which is to say the route that the motor vehicle still has to cover until the regeneration route is anticipated to be finished. The possible reduction of the lubricant dilution value is thus determined from this and compared to the determined value. If it is greater than this value, than the internal combustion engine is ultimately started, in particular only when the anticipated reduction is greater than the determined value.

On the whole, the internal combustion engine—if it is deactivated—is then activated only when the lubricant dilution value is above the first threshold value, the motor vehicle is at that point located at the regeneration route and this route is sufficient to reduce the lubricant dilution value by the determined value. However, it can be also provided that the internal combustion engine is started as a result of other circumstances, for example as a result of the corresponding operation carried out by the driver of the motor vehicle. If it is stated within the content of this description that the internal combustion engine is started, this preferably means that the internal combustion engine is started as long as it has not been operated so far, and that it was for example in the standstill state, or that it continues to be operated as long as it has already been operated.

According to another embodiment of the invention, a route profile of the regeneration route is evaluated to determine whether the regeneration route is sufficient to reduce the lubricant dilution value by the specified value, so that the route profile includes a speed profile, a height profile and/or a road class profile. The regeneration route is therefore associated with the road profile. In the road profile can be stored different variables, such as the speed profile, the height profile and/or the road class profile. The corresponding data are thus stored for example in the navigation system of the motor vehicle.

The speed profile indicates for example a directional speed or a highest speed or a corresponding course for the regeneration route. Under directional speed is to be understood the speed that can be expected under normal circumstances, while the highest speed indicates the maximum permissible speed.

The height profile preferably indicates the progress of the height on the regeneration route section so as to make it possible to determine in a simple manner which load on the internal combustion engine should be expected, or which output is expected to be provided by means of the internal combustion engine. If for example an ascending slope is anticipated, it is possible to draw from this the conclusion that an increased temperature of the internal combustion engine can be achieved in a simple manner because a corresponding output must be provided by the hybrid drive device or by the internal combustion engine in order to overcome the ascending slope.

However, in the case of a preceding downward slope, these conditions are not fulfilled because it is anticipated that the internal combustion engine will not need to be operated in order to cope with a regeneration route or with a corresponding section of the regeneration route.

In particular, the driving of the motor vehicle can often be carried out in the case of a downward slope by means of the electric engine alone, and it can also be operated recuperatively under certain circumstances, which is to say for converting kinetic energy of the motor vehicle into electric energy that can then be intermediately stored.

Finally, the road profile describes the road type, or which types of roads are present in the case of the regeneration route, in particular the progress of the road types. The road type can be selected for example from the following types of roads: highway, federal roads, country roads, local thoroughfare, or inner city street, in particular in a large city. The anticipated possible reduction of the lubricant dilution value is greater for example in the case of a highway than in the case of a local thoroughfare or of an inner city street because only low speeds are allowed on the latter type of road and stop-and-go traffic can often be expected instead of a continuous driving operation.

According to another embodiment, the internal combustion engine is started when a second threshold value is exceeded by the lubricant dilution value when the anticipated driving route has no regeneration route section. The second threshold value is preferable higher than the first threshold value. When the second threshold value is exceeded, the dilution of the lubricant due to the fuel is higher than when the first threshold value is exceeded. In this respect, it is therefore more urgent to take appropriate measures and to start the internal combustion engine. The anticipated driving route is again determined and it is ascertained as to whether it contains at least one regeneration route section. If this is not the case, he internal combustion engine is started immediately within the context of the preferred design of the internal combustion engine described above in order to reduce the lubricant dilution value.

According to another preferred embodiment of the invention, starting of the internal combustion engine is delayed when the second threshold value is exceeded by the lubricant dilution value until the regeneration route section is reached if the anticipated driving route has a regeneration route section. In the case above it was explained that when no regeneration route section is present, the internal combustion engine is started immediately when the lubricant dilution value has exceeded the second threshold value. In this case, the internal combustion engine is to be started immediately.

If, on the other hand, the anticipated driving route contains the regeneration route segment, the starting of the internal combustion engine can be postponed because the motor vehicle has reached the regeneration route. This is in particular the case when as expected, the lubricant dilution value does not exceed a specified limiting value prior to reaching the regeneration route, which means that it is smaller, until the regeneration route section is reached than this value. In other words, only when the second threshold value is exceeded by the lubricant dilution value, the starting of the internal combustion engine is delayed until the regeneration route section is reached when the anticipated driving route has a regeneration route and—optionally—the lubricant dilution value expected when the regeneration route is reached is less than the threshold value.

According to a further development of the invention, the starting of the internal combustion engine is delayed only when a predicted lubricant dilution value is lower than a lubricant dilution limiting value. The predicted lubricant dilution value is the lubricant dilution value that is expected upon reaching the next regeneration route that is expected to be present in the anticipated driving route. The predicted lubricant dilution value is for this purpose determined in a predictive manner, in particular so that it is estimated. For example, the predicting or the estimate is based on the route section profile on the anticipated route to be traveled. In this respect, reference is made to the explanations above relating to route profile of the regeneration route section.

For example, the predicted lubricant dilution value can be obtained by summing up or integrating expected values for the increase of the lubricant dilution value during the progress of the anticipated driving route until the regeneration route section is reached. According to the embodiments mentioned above, the starting of the internal combustion engine can be delayed only when the predicted lubricant dilution value, which is to say the expected lubricant dilution value, is smaller than the lubricant dilution limiting value upon reaching the regeneration route section. The lubricant dilution threshold value can be selected for example as desired. However, it can also correspond to a third threshold value or a fourth threshold value described below.

According to a preferred embodiment of the invention, the internal combustion engine is started when the lubricant dilution value exceeds a third threshold value when an electric drive priority value is different from the maximum value. The third threshold value is again greater than the first threshold value and/or the second threshold value.

When the lubricant dilution value exceeds the third threshold value, the dilution of the lubricant by the fuel is greater than when the second threshold value is exceeded or when the first threshold value is exceeded. If the third threshold value is exceeded by the lubricant dilution value, the electric drive priority is compared to its maximum value. If is it less than that, the internal combustion engine is started, in particular only then.

The electric drive priority is determined for example by the driver of the motor vehicle and/or by a driver assistance system of the motor vehicle. The higher the electric drive priority value, the greater should also be the ratio of the power provided by means of the electric engine. Accordingly, the output provided during the driving operation by means of the internal combustion engine is smaller the higher the electric driver priority value.

The electric drive priority value can be determined for example so that it is set or selected between a minimum and a maximum value. It goes without saying that it can be provided so that the electric drive priority value is assumed only for the minimum value and the maximum value. However, it is preferred when at least one intermediate step is provided. Such a procedure allows, for example, the driver of the motor vehicle to manually deactivate the internal combustion engine and to continue further driving with the electric engine, wherein he sets the electric drive priority value to the maximum value, for example by operating a corresponding operating element, in particular a switch, a push button, a selection lever or the like.

Finally, it may be provided within the context of another preferred embodiment of the invention that the internal combustion unit is always started when a fourth threshold value is exceeded by the lubricant dilution value. The fourth combustion threshold value is higher than the first threshold value and/or than the second threshold value and/or than the first threshold value. For example, the fourth threshold value corresponds to a maximum permissible lubricant dilution value and thus to critical lubricant dilution. In this case, the internal combustion engine is always put into operation, independently of other conditions.

The invention further relates to a motor vehicle, in particular a motor vehicle for carrying out the method according to the embodiments described above, wherein the motor vehicle is provided with a hybrid drive apparatus, which is equipped with an internal combustion engine that can be operated with fuel, as well as with an electric engine, wherein a lubricant is supplied at least intermittently to the internal combustion engine. At the same time, the motor vehicle is designed to determine a lubricant dilution value of the dilution of the lubricant by the fuel, so that when a first threshold value is exceeded by the lubricant dilution value, the internal combustion engine is started when the motor vehicle is located on a regeneration route section in order to reduce the lubricant dilution value by a specified value.

The advantages of such a procedure or of such configuration of the motor vehicle have already been pointed out above. Both the vehicle and the corresponding method can be further developed according to the embodiments above, so that reference is made to them in this regard.

BRIEF DESCRIPTION OF THE DRAWING

The invention will be next explained with reference to the embodiment illustrated in the drawing, without any limitation of the invention. The single FIGURE shows the following:

FIG. 1 indicates a motor vehicle on a driving route of the motor vehicle that is divided into several partial sections.

FIG. 1 shows a vehicle 1 which is provided with a hybrid apparatus having an internal combustion engine. Fuel and lubricant are used in order to operate the internal combustion engine. The motor vehicle 1 travels on a specified driving route 2. The driving route 2 is preferably determined by a navigation system, not shown, of the motor vehicle 1. For this purpose, the starting point 3 can correspond to the position of the motor vehicle 1 at the beginning of its operation, so that the destination point 4 is or has been set by the driver of the motor vehicle. The navigation system then divides the driving route 2 into several partial routes 5, 6 and 7.

A route profile is assigned to the driving route 2, and in this respect also to the partial routes 5, 6 and 7, which comprises for example a speed profile, a height profile and/or a road category profile. Based on the route profile it is then determined whether one of the partial routes of the driving route 2 is present in the form of a regeneration route during which it is possible for the motor vehicle 1 to reduce a lubricant dilution value.

The lubricant dilution value describes the dilution of the lubricant by the fuel, which can occur in particular during a warm-up operation of the internal combustion engine.

Different measures can be introduced depending on the lubricant dilution value. So for example, the internal combustion machine is started when the first threshold value is exceeded by the lubricant diluting value, in particular only when the motor vehicle is located on a regeneration route (here for example the partial route 5) of the anticipated driving route 2 of the motor vehicle 1 and the regeneration route is sufficient to reduce the lubricant diluting value by a specified value.

On the other hand, if the lubricant dilution value exceeds a second threshold value, which is higher than the first threshold value, the internal combustion engine is started when the anticipated driving route does not have a regeneration route. However, if the partial route 6 is provided as a regeneration route, the starting of the internal combustion engine is delayed until this regeneration route is reached. The same is applicable also if the partial route 7 is provided as a regeneration route or if it has been identified as such.

If a third threshold value or a fourth threshold value is exceeded, the anticipated driving route is not considered. Therefore, when the third threshold value is exceeded by the lubricant dilution value, the internal combustion engine is always started when the electric drive priority value is different from a maximum value. If, on the other hand, the lubricant dilution value is above even the fourth threshold value, the internal combustion engine is always operated, or put into operation in order to reduce the lubricant dilution value.

The invention claimed is:

1. A method for operating a motor vehicle provided with a hybrid drive device, wherein the hybrid drive device is equipped with an internal combustion engine that can be operated with fuel, as well as with an electric engine, and a lubricant is supplied at least intermittently to the internal combustion engine, comprising:

determining a lubricant dilution value with a dilution of the lubricant, wherein the internal combustion engine is started when a first threshold value is exceeded by the lubricant dilution value and when the motor vehicle is located on a regeneration route of an anticipated driving route of the motor vehicle, wherein the regeneration route is a travel path of the motor vehicle, which has a predetermined condition so that the lubricant dilution value is reduced to a specified value within a predetermined time during the motor vehicle drives on the regeneration route, wherein the regeneration route is considered together with at least one threshold value of the lubricant dilution value in controlling a start of the internal combustion engine so that the dilution of the lubricant is reduced within the predetermined time, wherein in order to determine whether the travel path of the motor vehicle has the predetermined condition as the regeneration route, a route profile of the regeneration is evaluated, wherein the route profile comprises a speed profile, a height profile and a road class profile, wherein the regeneration route enables the reduction of the dilution of the lubricant within the predetermined time, wherein when a second threshold value is exceeded by the lubricant dilution value, the internal combustion engine is started when the anticipated driving route does not contain any regeneration route, and wherein when the second threshold value is exceeded by the lubricant dilution value, the starting of the internal combustion engine is delayed until the motor vehicle arrives at the regeneration route when the anticipated driving route is provided with the regeneration route.

2. The method according to claim 1, wherein the starting of the internal combustion engine is delayed only when a predicted lubricant dilution value is lower than a lubricant dilution limiting value.

3. The method according to claim 2, wherein when a third threshold value is exceeded by the lubricant dilution value, the internal combustion engine is started when an electric drive priority value is different from a maximum value.

4. The method according to claim 3, wherein when a fourth threshold value is exceeded by the lubricant dilution value, the internal combustion engine is always started.

* * * * *